(12) United States Patent
Tiecher (10) Patent No.: US 12,150,455 B2
(45) Date of Patent: Nov. 26, 2024

(54) MACHINE AND METHOD FOR CONVEYING FOWL GIBLETS

(71) Applicant: Mauro Tiecher, Chapecó (BR)

(72) Inventor: Mauro Tiecher, Chapecó (BR)

(*) Notice: Subject to any disclaimer, the term of this patent is extended or adjusted under 35 U.S.C. 154(b) by 114 days.

(21) Appl. No.: 17/915,191

(22) PCT Filed: Dec. 31, 2020

(86) PCT No.: PCT/BR2020/050638
§ 371 (c)(1),
(2) Date: Sep. 28, 2022

(87) PCT Pub. No.: WO2022/027115
PCT Pub. Date: Feb. 10, 2022

(65) Prior Publication Data
US 2023/0172219 A1   Jun. 8, 2023

(30) Foreign Application Priority Data

Aug. 4, 2020 (BR) .................. 10 2020 015854 6

(51) Int. Cl.
*A22C 21/00* (2006.01)
*A22C 21/06* (2006.01)

(52) U.S. Cl.
CPC ...... *A22C 21/0061* (2013.01); *A22C 21/0053* (2013.01); *A22C 21/06* (2013.01)

(58) Field of Classification Search
CPC .. A22C 21/0061; A22C 21/0053; A22C 21/06
USPC ...................................................... 452/173
See application file for complete search history.

(56) References Cited

U.S. PATENT DOCUMENTS

| 5,346,427 | A | * | 9/1994 | Clark | ............ A22C 21/06 |
| | | | | | 452/117 |
| 6,499,588 | B1 | | 12/2002 | Eberle | |
| 8,439,730 | B1 | * | 5/2013 | Gasbarro | ........ A22C 21/00 |
| | | | | | 452/111 |
| 2012/0000750 | A1 | | 1/2012 | Klein | |

(Continued)

FOREIGN PATENT DOCUMENTS

| BR | MU8701945 | 9/2009 |
| BR | MU8800054 | 5/2011 |
| BR | 102013019763 | 7/2016 |

(Continued)

OTHER PUBLICATIONS

International Search Report for PCT/BR2020/050638 dated Apr. 19, 2021.

*Primary Examiner* — Richard T Price, Jr.
(74) *Attorney, Agent, or Firm* — B. Aaron Schulman, Esq.; Stites & Harbison, PLLC (57) ABSTRACT

The present invention relates to a machine (M) for conveying fowl giblets (not shown) that is provided with an input belt (M1) for conveying fowl giblets (not shown) to a cleaning system (S) and an output belt (M2) for conveying fowl giblets (not shown) away from the cleaning system (S), said giblets being moved onto the output belt (M2) by a collection and distribution device (M3). The machine (M) includes an assembly (5) for tensioning the belts (M1 and M2) between a stretched position, a working position and a retracted position for cleaning. The invention also relates to a method for conveying fowl giblets (not shown).

20 Claims, 7 Drawing Sheets

(56) References Cited

U.S. PATENT DOCUMENTS

2014/0131172 A1* 5/2014 Greve .................. B01F 31/441
  198/547
2022/0400693 A1* 12/2022 Wills ..................... B65G 23/44

FOREIGN PATENT DOCUMENTS

| BR | 202015018345 | 2/2017 |
| BR | 102015021601 | 3/2017 |
| BR | 202015021603 | 3/2017 |
| BR | 202016020834-9 | 3/2018 |
| BR | 202017012153 | 12/2018 |
| BR | 202017016218 | 3/2019 |

* cited by examiner

MACHINE AND METHOD FOR CONVEYING FOWL GIBLETS

BACKGROUND OF THE INVENTION

The present invention relates to a machine for conveying fowl giblets. This machine can also be called as a repeeling apparatus. Moreover, the present invention is particularly used to promote the cleaning and peeling of poultry giblets, such as gizzards, hearts and/or any of the alike, from chickens, hens, turkeys, or any other king of poultry. The repeeling apparatus performs the peeling operation as many times as needed. This repeeling apparatus is designed to accomplish the cleaning of giblets more efficiently and effectively. It also has manually manipulated conveyors to facilitate their sanitization operation.

Furthermore, the invention also presents a method for conveying fowl giblets, with steps providing greater efficiency and effectiveness in the cleaning of the giblets.

Poultry giblets repeeling apparatus used to clean the giblets are well known for those of ordinary skill in the art of poultry processing.

These apparatuses were developed to fulfill safety requirements, to avoid work accidents, as well as to reduce the need of manual labor during the selection and cleaning of giblets from slaughtered birds, which are widely marketed in the food industry worldwide. Thus, for such giblets to be marketed properly and with increased added value, after the extraction of the giblets from the carcasses of slaughtered birds, it is necessary to remove residual parts attached to the giblets.

Initially, the cleaning and peeling of giblets was performed manually by human labor, to clean each piece individually, resulting in low productivity, high rate of repetitive strain injuries (RSI), and work accidents.

Hence, automated apparatuses have been developed to perform this cleaning task, with the requirement of only one human operator for supervision purposes, who simply needs to handle the giblets that do not reach a satisfactory level of quality, after passing through the apparatus cleaning device. Thus, the human operator selects the giblets that need to undergo the cleaning process again, repositioning them in the apparatus.

Examples of apparatus developed for this purpose are presented by the Brazilian patent documents BR202015018345-9, BR202016020834-9, and BR202017012153-0, all owned by the same applicant of the invention disclosed in the present document. The above-mentioned documents present specific improvements in the apparatus and devices used for cleaning and peeling giblets.

Nevertheless, despite visible improvements in the automation of the giblets cleaning processes, the applicant, continuing his studies in the field, envisioned the possibility of developing a repeeling apparatus and method that could achieve greater efficiency in the removal of giblets residues, once the state of the art technologies allow only a very direct displacement of the giblets that pass through the device designed to perform the removal of the residues from the giblets.

Thus, frequently, the giblets end up not receiving proper cleaning the first time they are subjected to the cleaning device, and it is necessary to process the giblets once more in the cleaning device, impairing the productivity.

In addition, the need to develop a conveyor belt tensioning assembly that allows their manipulation in a manner that the work position and the sanitization position can be manually switch was also envisioned, since the conveyor belts should be cleaned periodically, in order to fulfill food industry standards. The solutions available in the market are complex and usually automated, resulting in a more expensive product.

Another inconvenience found in the state of the art is the location of the control panel, usually placed below the conveyor belts level, impairing the labor ergonomics, and exposing this panel to contact with the water used during the cleaning of the conveyor belts, normally accomplished with water jets or hoses.

Additionally, one more inconvenience found in the state of the art is the lack of a classifying and directing device for the giblets that arrive for the first time in the inlet conveyor belt of this apparatus, in cases that these giblets are transported in an automated manner from a prior processing machine, which supplies the giblets with a high quantity of residual parts with it, and these parts are not marketed together with the giblets.

In order to solve this inconvenience of the state of the art, the present invention discloses an apparatus and a method for cleaning and repeeling poultry giblets, wherein the giblets directing flows are provided during their cleaning, in such a manner that the movement of the giblets in the cleaning assembly of the system occurs in a more intensive way, providing, thereof, a better cleaning of the giblets and avoiding the need to pass the giblets in the cleaning assembly again.

Thus, it is an object of the present invention to provide an apparatus and a method for cleaning and repeeling poultry giblets, in which a first directing flow of giblets, that occurs over the cleaning assembly, results in a back and forth movement of giblets, while a second directing flow of giblets, generated by the rotation of a giblet guiding station, works to move the giblets in the exit direction of the cleaning assembly, at the same time as it presses these giblets against the cleaning assembly, simultaneously resulting in a rotational displacement of the giblets.

Furthermore, it is an object of the present invention to disclose an apparatus for cleaning and repeeling poultry giblets with a conveyor belt tensioning assembly, wherein the operation is performed completely manually, leading to practicality at low acquisition, operation, and maintenance costs.

It is also an object of the present invention to provide an apparatus for cleaning and repeeling poultry giblets, wherein this apparatus may have a device for classifying and directing the giblets which are distributed on the inlet conveyor belt of the machine, in order to direct to the conveyor belt only the giblets with dimensions considered adequate, and conveniently diverting their residual parts.

Another object of the present invention is to provide an apparatus for cleaning and repeeling poultry giblets with a control panel placed at a higher level than the apparatus cleaning system, in such a manner that the water used to clean the conveyor belts do not make it wet.

Advantageously, the invention here disclosed presents an apparatus and a method for cleaning poultry giblets, exhibiting a more effective and efficient design, nevertheless simple, resulting in gains of productivity, increasing the final quality of the products, and making the process of cleaning more reliable and standardized, without the need of frequent human intervention. In addition, it makes the conveyor belts sanitization more practical. All these features result in an overall acquisition, operation, and maintenance costs reduction.

Schematic drawings of a particular embodiment of the invention can herein be seen. The dimensions and propor-

DESCRIPTION OF THE INVENTION

As illustrated in the drawings, the apparatus M for cleaning and repeeling poultry giblets is comprises an inlet conveyor belt M1, which conveys the poultry giblets to a system S for cleaning poultry giblets, and further comprises an outlet conveyor belt M2, which conveys the poultry giblets that leave the system S, wherein the poultry giblets are directed onto the outlet conveyor belt M2 by means of a collecting and distributing device M3.

The directing of the giblets (not shown) from the system S to the collecting and distributing device M3 is preferably performed by a set of gutters (not shown), which interconnect an outlet gutter M5 of the system S with the collecting and distributing device M3, and can be configured by different devices known in the state of the art, which are capable of automatically convey the giblets (not shown) to the outlet conveyor belt M2.

Preferably, the apparatus M is used for cleaning gizzards, nevertheless it can also be used for cleaning other types of giblets (not shown), such as, but not limited to, hearts.

As illustrated by FIG. 10 to 13, the system S comprises a poultry guiding station 1 set against a cleaning assembly 2, both simultaneously moved by a drive assembly 4. The guiding station 1 constantly shakes and press the giblets (not shown) against the cleaning assembly 2. These movements remove residual parts of the giblets (not shown) that pass through the system S.

In addition, the drive assembly 4 is also responsible for the traction moving of the shafts M10 and M20 of the conveyor belts M1 and M2.

As illustrated by FIG. 2 to 9, the apparatus M comprises a tensioning assembly 5 for switching the position of conveyor belts M1 and M2 between a stretched working position (see FIGS. 2, 4, 6 and 8) and a retracted sanitization position (see FIGS. 3, 5, 7 and 9). Thus, when it is necessary to perform the periodic sanitization of the apparatus M, in order to fulfill the sanitization standards and practices of the food industry, the tensioning assembly 5 provides a manual handling of the conveyor belts M1 and M2, resulting in an easier and more practical way to sanitize their internal parts.

Therefore, the tensioning assembly 5 comprises a first handling device 50, installed adjacently to the inlet conveyor belt M1, and a second handling device 51, installed adjacently to the outlet conveyor belt M2. Both handling devices 50 and 51 are manually triggered, and preferably installed on the side structures of the apparatus M.

Furthermore, as illustrated by FIG. 2 to 9, preferably, the tensioning assembly 5 comprises a first displacement module 52, moved by the movement of the first handling device 50, and a second displacement module 53, set to motion from the movement of the second handling device 51.

The tensioning assembly 5 also preferably comprises a first guiding rails 55 for the movement of the first displacement module 52, and a second guiding rails 56 for the movement of the second displacement module 53. and the referred displacement modules 52 and 53 provide a bearing mount for the shafts M10 and M20 of the conveyor belts M1 and M2.

Thus, when handling devices 50 and 51 are activated to allow the retraction of the conveyor belts M1 and M2, the retraction movement itself forces the forward movement of the displacement modules 52 and 53, together with the shafts M10 and M20. Similarly, when the handling devices 50 and 51 are activated to stretch the conveyor belts M1 and M2, the handling devices 50 and 51 themselves force the displacement modules 52 and 53 to recoil, also resulting in the movement of the shafts M10 and M20.

Preferably, as illustrated by FIG. 2 to 9, the first handling device 50 comprises a displacement element 500 interconnected with a first handler 501, and the second handling device 51 comprises a displacement element 510 interconnected with a second handler 511.

The displacement elements 500 and 510 comprise curved shapes that contact the displacement modules 52 and 53. In addition, these displacement elements 500 and 510 rotate by 90 degrees, between a horizontal position, causing maximum advance and locking of the displacement modules 52 and 53 (see FIGS. 2, 4, 6 and 8), and a vertical position, resulting in the releasing of the recoil of the displacement modules 52 and 53 (see FIGS. 3, 5, 7 and 9).

Thus, the curved shapes, preferably with displacement elements 500 and 510 with rounded ends, allow the rotation of the handling devices 50 and 51 to occur smoothly, both when they are already in contact with the displacement modules 52 and 53, as when they are not in contact from the beginning and afterwards initiate contact with the displacement modules 52 and 53 to move them to their stretching positions of the conveyor belts M1 and M2.

Furthermore, preferably, as illustrated by FIG. 2 to 9, the tensioning assembly 5 comprises a first locking device 57 of the first handler 501 in the horizontal position, and a second locking device 58 of the second handler 511 in the horizontal position.

Thus, these locking devices 57 and 58 are responsible for mechanically locking the handling devices 50 and 51 in their respective positions for stretching the conveyor belts M1 and M2, i.e., they are responsible for keeping the handling devices 50 and 51 in a horizontal position and pressing the displacement modules 52 and 53 to prevent the retraction of the conveyor belts M1 and M2.

In an embodiment of this invention, the locking devices 57 and 58 are configured by mechanical locks, which are manually manipulated to switch between an open position and a closed position. Thus, when it is necessary to retract the conveyor belts M1 and M2, the human operator (not shown) opens these locks and freely manipulates the handling devices 50 and 51. Similarly, after returning the conveyor belts M1 and M2 to their stretched positions, the human operator (not shown) closes these locks again, preventing any involuntary movement of the handling devices 50 and 51.

Figure 2:
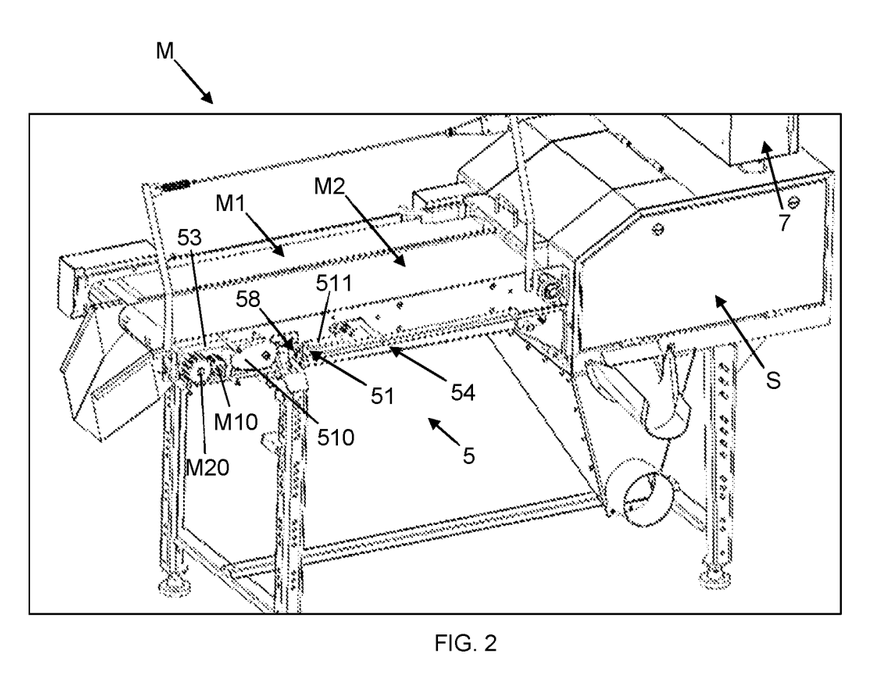
FIG. 2 illustrates an enlarged partial back perspective view of the apparatus M, emphasizing the conveyor belts M1 and M2 in the stretched working position.
Figure 3:
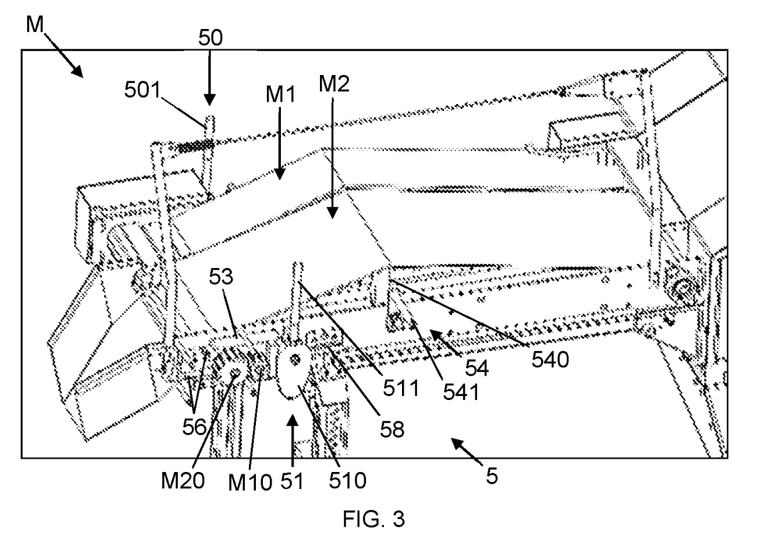
FIG. 3 illustrates an enlarged partial back perspective view of the apparatus M, emphasizing the conveyor belts M1 and M2 in a retracted sanitization position.
Figure 4:
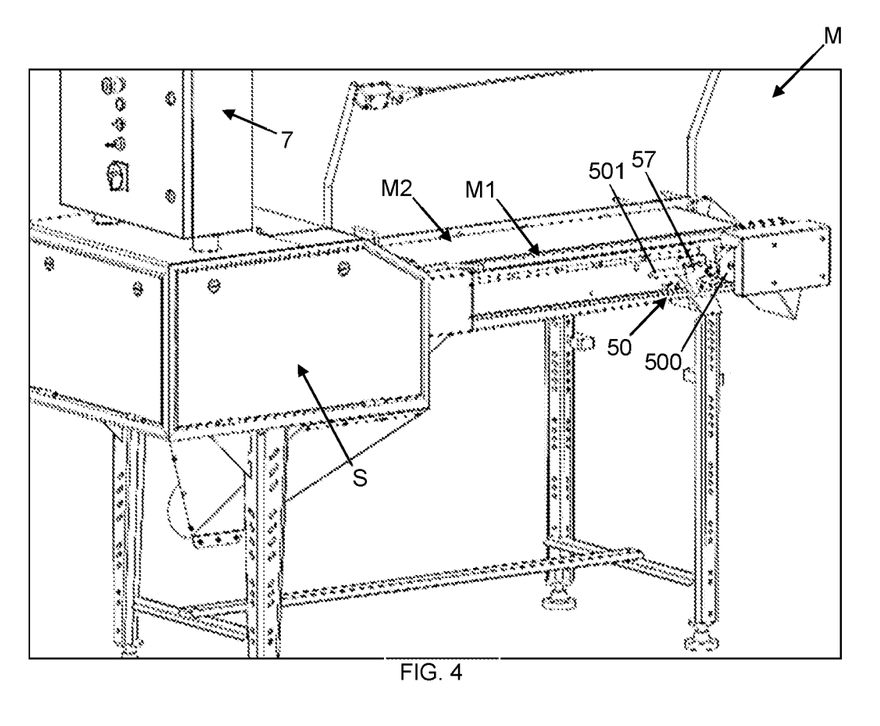
FIG. 4 illustrates an enlarged partial front perspective view of the apparatus M, emphasizing the conveyor belts M1 and M2 in the stretched working position.
Figure 5:
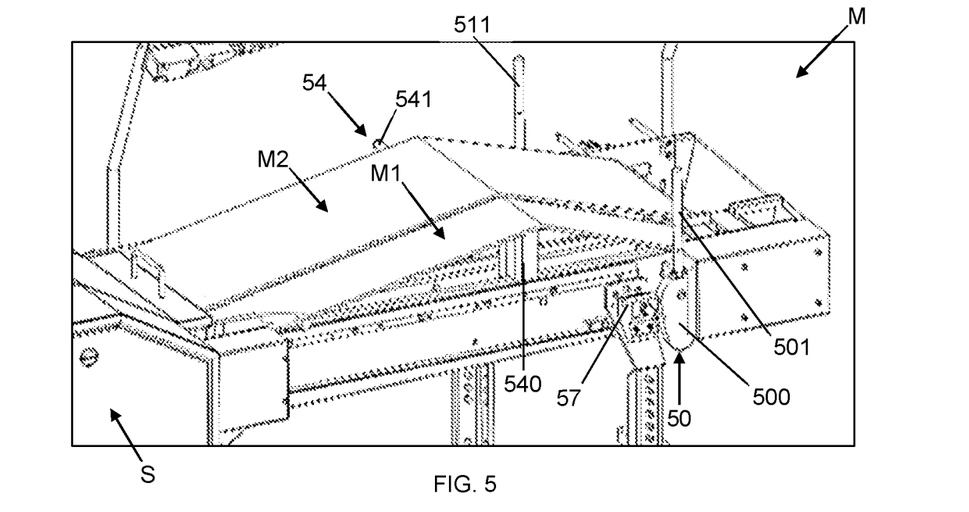
FIG. 5 illustrates an enlarged partial front perspective view of the apparatus M, emphasizing the conveyor belts M1 and M2 in a retracted sanitization position.
Figure 6:
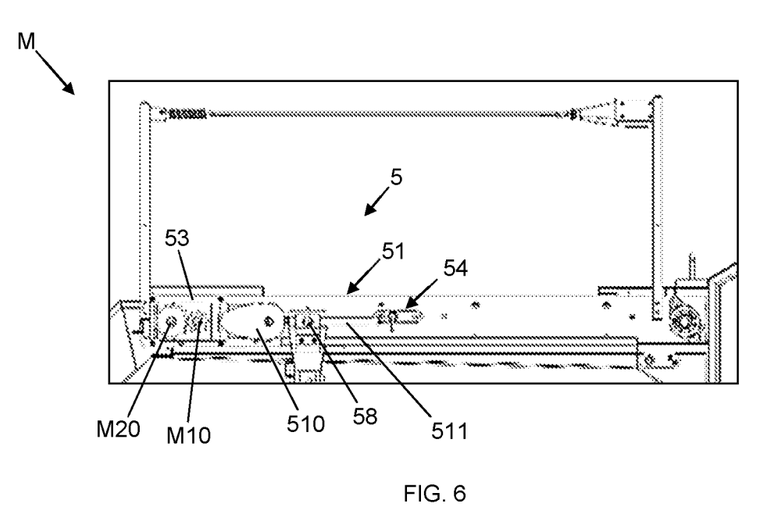
FIG. 6 illustrates an enlarged partial back perspective view of the apparatus M, emphasizing the second handling device 51 in the locking working position.
Figure 7:
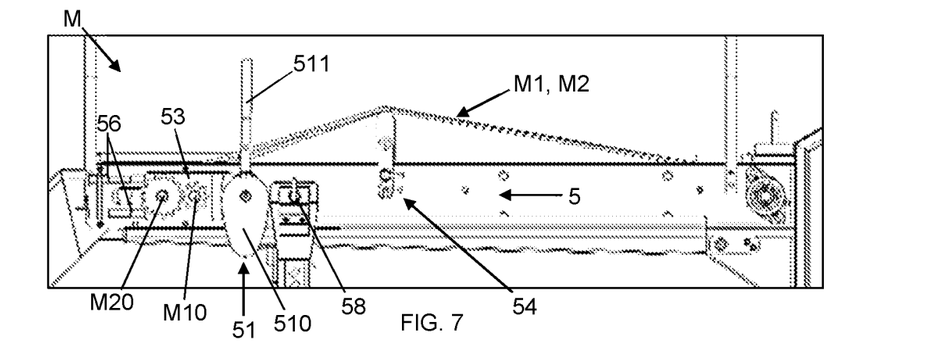
FIG. 7 illustrates an enlarged partial back perspective view of the apparatus M, emphasizing the second handling device 51 in the released sanitization position.
Figure 8:
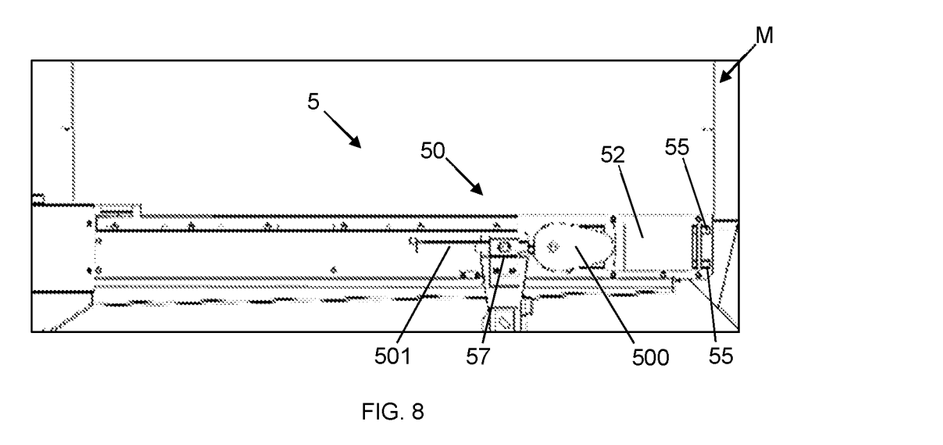
FIG. 8 illustrates an enlarged partial front perspective view of the apparatus M, emphasizing the first handling device 50 in the locking working position.
Figure 9:
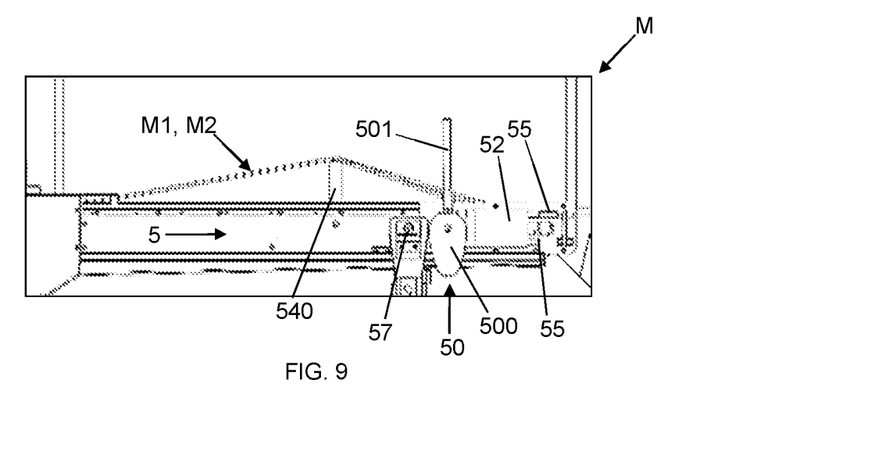
FIG. 9 illustrates an enlarged partial front perspective view of the apparatus M, emphasizing the first handling device 50 in the released sanitization position.
Figure 10:
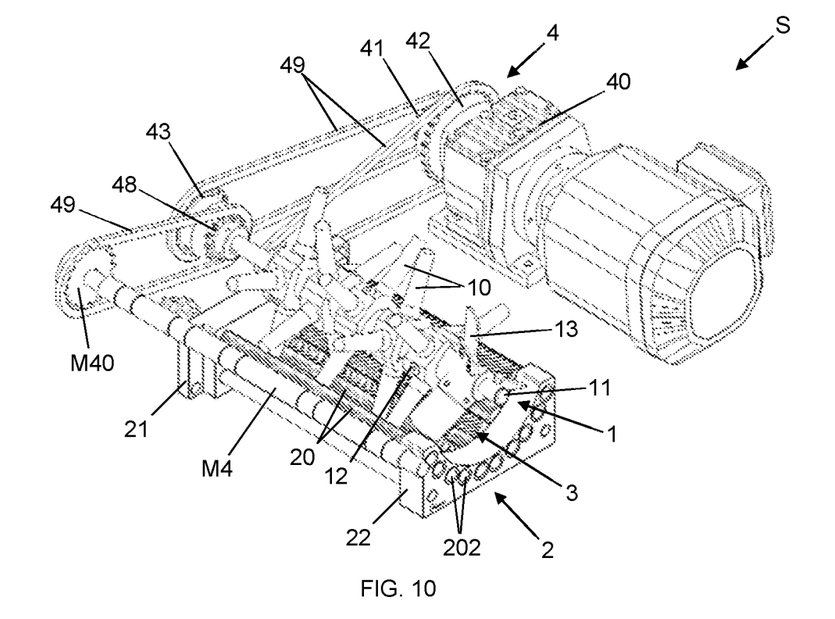
FIG. 10 illustrates a perspective view of the system S.
Figure 11:
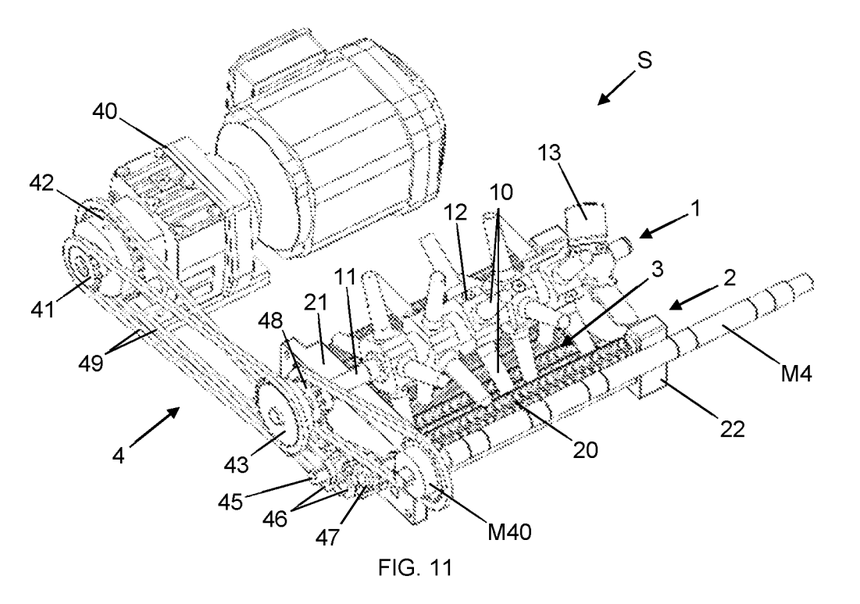
FIG. 11 illustrates a perspective view of the system S.
Figure 12:
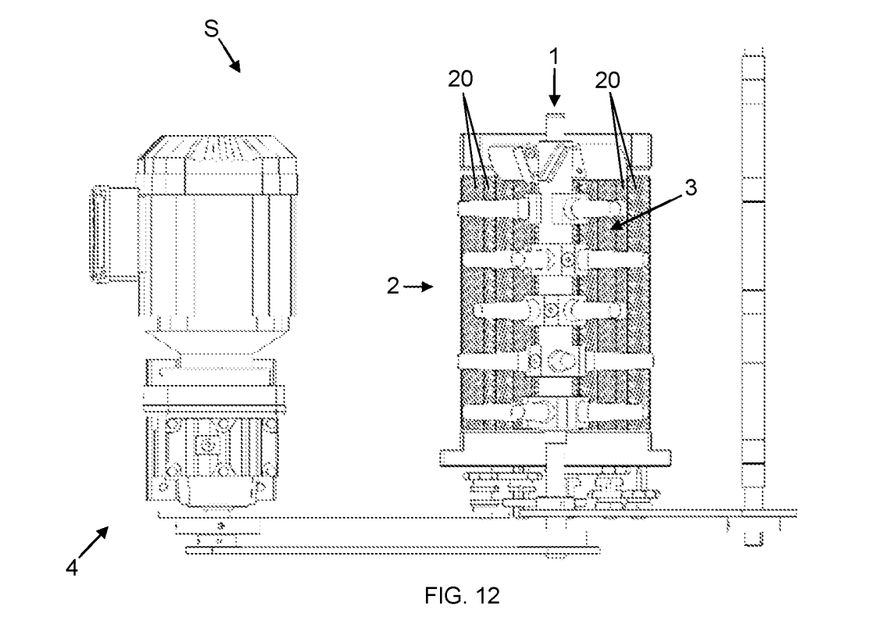
FIG. 12 illustrates a top view of the system S.
Figure 13:
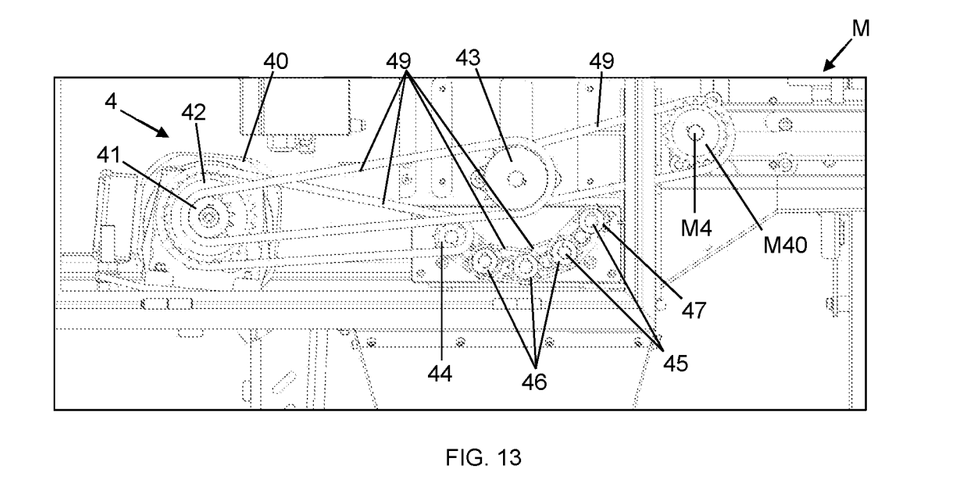
FIG. 13 illustrates an enlarged partial schematic front view of the apparatus M, emphasizing the drive assembly 4.

As illustrated by FIGS. 2 and 3, preferably, the tensioning assembly 5 also comprises a manual tensioning device 54 installed under the conveyor belts M1 and M2. This manual tensioning device 54 has a vertical lifting structure 540 triggered from a lever 541.

Thus, when the handling devices 50 and 51 are activated, allowing the retraction of the conveyor belts M1 and M2, the manual tensioning device 54 can perform this retraction of the conveyor belts M1 and M2. Accordingly, an operator (not shown) manipulates the lever 541 to raise the vertical lifting structure 540, which forces the lifting of the conveyor belts M1 and M2 canvas (see FIGS. 3, 5, 7 and 9), and the movement of the displacement modules 52 and 53.

An optional embodiment of the present invention can occur when apparatus M is placed in sequence with another giblet processing apparatus (not shown). For the optimization of the giblets received directly from this other processing apparatus (not shown) to the apparatus M, the latter comprises a giblet separating and distributing collector 6. The giblet separating and distributing collector 6 is placed directly in the apparatus M, preferably on the inlet conveyor belt M1, on the outlet conveyor belt M2, or on the collecting and distributing device M3.

Figure 1:
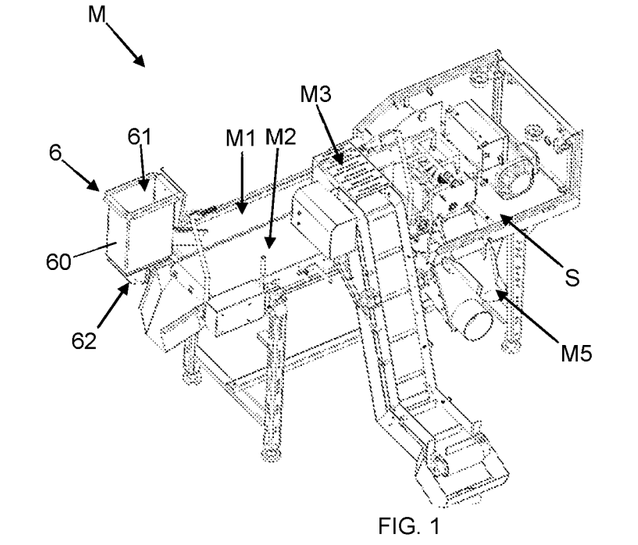
FIG. 1 illustrates a schematic perspective view of the apparatus M, emphasizing the system S.

As can be seen in FIG. 1, preferably, the giblet separating and distributing collector 6 comprises a body 60 provided with a reception and distributing duct 61 and a diverting duct 62, separated from each other by a separating screen (not shown), and the reception and distributing duct 61 ends up on the inlet conveyor belt M1, or on the outlet conveyor belt M2, or on the collecting and distributing device M3, and the diverting duct 62 opens into a drain pipe (not shown) of the apparatus M.

Therefore, the separating screen (not shown) allows only the giblets (not shown) with dimensions considered adequate to be sent to the inlet conveyor belt M1, and these dimensions may vary according to the demand of each application.

In addition, preferably, the apparatus M comprises a control panel 7 installed at a substantially much higher level than the conveyor belts M1 and M2, in order to facilitate the use, in a more ergonomic way, by the operators (not shown), and also to prevent accidental contact with the water used in the cleaning procedures of the conveyor belts M1 and M2.

As can be seen in FIG. 10 to 14, preferably, the system S comprises a first directing flow of giblets, moving in opposite directions relative to one other, over a guiding region 3, defined by the positioning of the cleaning and guiding elements 20 of the cleaning assembly 2.

Thus, the guiding region 3 acts as a cradle for the giblets (not shown) dumped on the cleaning assembly 2 from the inlet conveyor belt M1, and the first directing flow of giblets (not shown) occurs due to the movement of the cleaning and guiding elements 20 of the cleaning assembly 2, which direct the giblets (not shown) back and forth, as they go through the cleaning assembly 2.

These giblets back and forth movement results in a better cleaning of the giblets themselves, as it makes them remain longer on the cleaning assembly 2. In addition, it forces the giblets (not shown) to move more intensely, allowing the cleaning assembly 2 to remove residual parts from different positions of each giblet's body (not shown).

Furthermore, the first directing flow cooperates with a second directing flow from the inlet to the outlet of the giblet cleaning assembly 2. This second directing flow tends to push the giblets (not shown) always forward, in the outlet direction of the cleaning assembly 2, while the first directing flow directs the giblets (not shown) back and forth.

Therefore, the first directing flow of giblets (not shown) is provided by movement of the cleaning and guiding elements 20 relative to one other, while the second directing flow of giblets (not shown) is provided by movement of a plurality of pressing elements 10 installed along and around a rotating shaft 11 of the guiding station 1.

Figure 14:
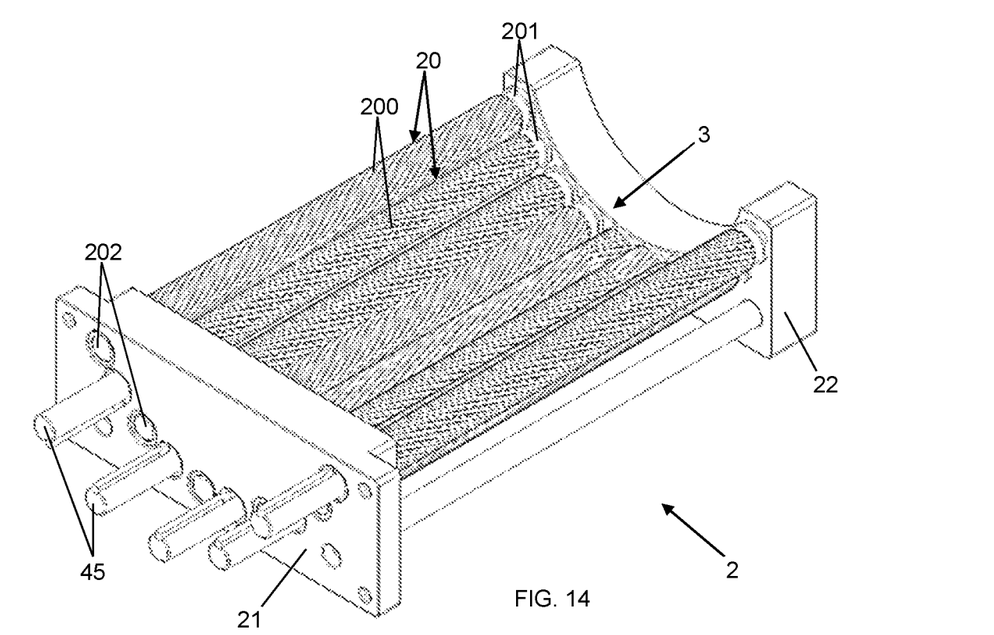
FIG. 14 illustrates a perspective view of the cleaning assembly 2.

As shown in FIG. 14, the cleaning assembly 2 comprises an inlet support 21 and an outlet support 22 that support the edges 202 of each cleaning and guiding element 20. Thus, the cleaning and guiding elements 20 are arranged to form a giblet accommodation cradle, which defines the guiding region 3.

Preferably, this guiding region 3 is designed as an arc shape, in such a way that while the giblets (not shown) move to the edges of this arc, they are also forced to return to the bottom of the region, by action of gravity, preventing the giblets (not shown) from fall over the sides of the cleaning assembly 2.

Also, as illustrated in FIG. 14, each cleaning and guiding element 20 comprises guiding elements 200, such as guiding protrusions, distributed along its entire contact surface 201 with the giblets (not shown), and such guiding elements 200 are responsible for defining the first directing flow of the giblets (not shown) together with movement of the cleaning and guiding elements 20 relative to one other.

In a preferable way, as illustrated by the drawings, the cleaning assembly 2 comprises cleaning and guiding elements 20 set in groups in which the directions of their respective guiding elements 200 are pointed towards opposite directions regarding the next group. Thus, each group of cleaning and guiding elements 20 works in opposite direction to the direction of the adjacent group of cleaning and guiding elements 20.

Therefore, the relative movement of one group of cleaning and guiding elements 20 directs the giblets (not shown) to one side, while the adjacent group of cleaning and guiding elements 20 directs the giblets (not shown) to the opposite side, resulting in a directing flow with a back and forth movement effect.

As a result, the giblets (not shown) certainly move over different groups of the cleaning and guiding elements 20, as they are directed back and forth throughout the cleaning assembly 2.

As an example, in one possible embodiment of this invention, each group of cleaning and guiding elements 20 is composed of two cleaning and guiding elements 20, wherein the guiding elements 200 are arranged diagonally along the contact surface 201 of each cleaning and guiding element 20.

Thus, these guiding elements 200 of each cleaning and guiding element 20 are positioned in directions concurrent with directions of the guiding elements 200 of other cleaning and guiding element 20 belonging to a same group of cleaning and guiding elements 20, forming, this way, arrows that point one way or the other.

Nevertheless, it can be understood that other forms of guiding elements 200 may be implemented, provided that they act to direct each group of cleaning and guiding elements 20 to opposite sides in an alternate manner.

Furthermore, it can be understood that the number of cleaning and guiding elements 20 of each group of cleaning and guiding elements 20 may also vary, depending on the characteristics of the giblets (not shown), the shapes of the guiding elements 200 and also the dimensions of the cleaning and guiding elements 20.

Preferably, each pressing element 10 is designed as a frustoconical body with low flexibility and smooth surface. Such conformation allows these pressing elements 10 to push the giblets (not shown) against the cleaning and guiding elements 20 with greater efficiency.

Additionally, and preferably, the guiding station 1 comprises supports 12 installed along the rotating shaft 11. Each support 12 is used to support the plurality of pressing elements 10 around the rotating shaft 11 in positions displaced from positions of the pressing elements 10 supported by each adjacent support 12. Furthermore, the guiding station 1 comprises giblet outlet guiding propellers 13 from the guiding region 3 to the giblet output region.

As can be seen in FIG. 10 to 13, preferably, the drive assembly 4 comprises a gearmotor 40 for moving a first drive gear 41 and a second drive gear 42, both coaxial with one other and directly connected to the gearmotor 40.

The abovementioned first drive gear 41 transmits rotation to a first driven gear 43 installed on the rotating shaft 11, causing movement in the guiding station 1, while the second drive gear 42 transmits rotation to a first gear 44 installed on a shaft 45 of one of the cleaning and guiding elements 20, for the movement of the cleaning assembly 2.

In addition, to promote the movement of other cleaning and guiding elements 20, the first gear 44 transmits rotation to another gear 46 installed on a shaft 45 of a second one of the cleaning and guiding elements 20, and each another gear 46 transmits rotation to another subsequent gear 46 until a last gear is reached, and the last gear 46 transmits rotation to a peripheral gear 47.

Therefore, each cleaning and guiding element 20, intended to move in the cleaning assembly 2, is moved by a gear 44, 46 or 47 installed on a shaft 45 of these moving cleaning and guiding elements 20. Thus, the gears 44, 46 and 47 transmit rotation to one other, from the first gear 44 to the intermediate gears 46 and, finally, to the peripheral gear 47, positioned on the last moving cleaning and guiding element 20.

In addition, preferably, the drive assembly 4 comprises a second gear 48 installed on the rotating shaft 11 that transmits rotation to a gear M40 of a shaft M4 responsible for moving conveyor belts M1 and M2 of the apparatus M. Thus, a single drive assembly 4, equipped with a single gearmotor 40, can move the entire system S and conveyor belts M1 and M2 of the apparatus M.

Furthermore, preferably, each rotation transmission between two of the gears 41, 42, 43, 44, 46, 47, 48, i.e., the transmission between each pair of gears, is performed by a chain 49.

Figure 15:
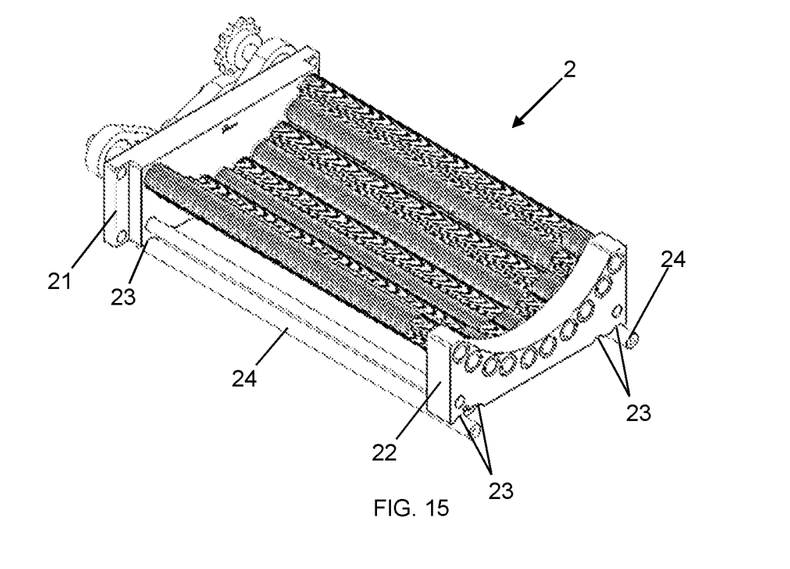
FIG. 15 illustrates a perspective view of a configuration embodiment of the cleaning assembly 2, emphasizing the sliding guides 23 and the mounting rail rods 24.

As can be seen in FIG. 15, preferably, the cleaning assembly 2 comprises sliding guides 23 for coupling and sliding on mounting rail rods 24 of the cleaning assembly 2 in the apparatus M. Thus, both assembly and maintenance of the cleaning assembly 2 can be easily accomplished, considering that it is considerably heavy and the mounting rail rods 24 allow said cleaning assembly 2 to be slid throughout them.

The present invention also relates to a method for cleaning and repeeling poultry giblets (not shown). This method may be applied in an apparatus M equipped with an inlet conveyor belt M1, which conveys poultry giblets to a system S for cleaning poultry giblets, and an outlet conveyor belt M2, which conveys poultry giblets out of the system S and direct them onto this outlet conveyor belt M2 by means of the collecting and distributing device M3.

Furthermore, said system S comprises a guiding station 1 of giblets set against a cleaning assembly 2, both moved by a drive assembly 4.

Thus, said method of cleaning and repeeling poultry giblets (not shown) comprises the following steps:
a) distributing of poultry giblets (not shown) on the apparatus M;
b) transporting of poultry giblets (not shown), not classified as satisfactorily clean, through the inlet conveyor belt M1 to the system S;
c) directing the poultry giblets (not shown) to a guiding region 3 defined by the positioning of the cleaning and guiding elements 20 of the cleaning assembly 2;
d) actuating a first directing flow of giblets (not shown) in opposite directions to each other on the guiding region 3, and simultaneously actuating a second directing flow of giblets (not shown) against the cleaning and guiding elements 20 and towards the collecting and distributing device M3;
e) collecting giblets (not shown) through the collecting and distributing device M3 and directing these giblets (not shown) to the outlet conveyor belt M2;
f) evaluating of giblets (not shown) and transferring the giblets (not shown) not classified as satisfactorily cleaned to the inlet conveyor belt M1;
g) repeating steps "b" to "f", for giblets (not shown) not classified as satisfactorily cleaned;
h) transporting poultry giblets (not shown), classified as satisfactorily cleaned, from the outlet conveyor belt M2 to a giblet collector (not shown);
i) repeating steps "a" to "h", until the distribution of poultry giblets (not shown) on the inlet conveyor belt M1 is stopped.

Thus, preferably, during step "a", the distribution of giblets (not shown) is performed by giblet separating and distributing collector 6 installed on apparatus M, preferably on the inlet conveyor belt M1, on the outlet conveyor belt M2 or on the collecting and distributing device M3. The giblet separating and distributing collector 6 comprises a body 60 with a reception and distributing duct 61 and a diverting duct 62, which are separated from each other by a separating screen (not shown).

The reception and distributing duct 61 opens onto the inlet conveyor belt M1 and the diverting duct 62 opens into a drain pipe (not shown) of the apparatus M.

Also, preferably, during step "d", the first directing flow is provided by movement of the cleaning and guiding elements 20 relative to one other, and the second directing flow is provided by movement of a plurality of pressing elements 10 installed along and around a rotating shaft 11 of the guiding station 1.

This method allows the peeling of giblets (not shown) to be performed more efficiently, with fewer giblets (not shown) having to undergo the system S more than one time.

Furthermore, the abovementioned method also improves the reliability and quality of the cleaning process, especially when the inspection implemented in step "f" is performed by a human operator (not shown), reducing the susceptibility to human error and alleviating the human workload, also making the process more ergonomic.

The person skilled in the art will readily notice from the description various ways of performing the invention without departing from the scope of the enclosed claims.

The invention claimed is:

1. A machine for conveying fowl giblets, for cleaning and peeling poultry giblets, the machine comprising:
   (a) a system for cleaning poultry giblets, comprising a poultry giblets guiding station set against a cleaning assembly, both set in motion by a drive assembly;
   (b) an inlet conveyor belt, conveying poultry giblets to the system for cleaning poultry giblets;
   (c) an outlet conveyor belt conveying the poultry giblets from the inlet conveyor belt and directing them to exit the cleaning system, using a collecting and distributing device; and
   (d) a tensioning assembly for switching position of the inlet conveyor belt and the outlet conveyor belt between a stretched and working position and a retracted and sanitation position; the tensioning assembly comprising a first handling device, installed adjacent to the inlet conveyor belt, and a second handling device, installed adjacent to the outlet conveyor belt.

2. The machine, according to claim 1, wherein the tensioning assembly further comprising a first displacement module actuated by movement of the first handling device; and a second displacement module actuated by movement of the second handling device.

3. The machine, according to claim 2, wherein the tensioning assembly further comprising: a first guiding rails for movement of the first displacement module, and a second guiding rails for movement of the second displacement module, wherein the displacement modules bear the shafts of the inlet conveyor belt and the outlet conveyor belt.

4. The machine, according to claim 1, wherein the first handling device further comprising a first displacement element interconnected with a first handler, and the second handling device further comprising a second displacement element interconnected with a second handler.

5. The machine, according to claim 4, wherein the displacement elements further comprising curved shapes for contacting the displacement modules; and
   wherein the displacement elements rotate by 90 degrees, switching between a horizontal position, for maximum advancement and locking of the displacement modules, and a vertical position, for releasing the recoil of the displacement modules.

6. The machine, according to claim 4, wherein the tensioning assembly further comprising a first locking device for locking the first handler in the horizontal position, and a second locking device for locking the second handler in the horizontal position.

7. The machine, according to claim 1, wherein the tensioning assembly further comprising a manual tensioning device installed under the inlet conveyor belt and the outlet conveyor belt, the manual tensioning device comprises a vertical lifting structure triggered from a lever.

8. The machine, according to claim 1, further comprising a giblet separating and distributing collector.

9. The machine, according to claim 8, wherein the giblet separating and distributing collector further comprising a body provided with a reception and distributing duct and a diverting duct, separated from each other by a separating screen,
   wherein the reception and distributing duct ends up on the inlet conveyor belt and the diverting duct ends up into a drain pipe of the machine.

10. The machine, according to claim 1, further comprising a control panel installed at a higher level than the inlet conveyor belt and the outlet conveyor belt.

11. The machine, according to claim 1, wherein the system further comprising: a first directing flow of giblets moving in opposite directions relative to one other and developing over a guiding region defined by the positioning cleaning and guiding elements of the cleaning assembly,
    Wherein the first directing flow is provided by movement of the cleaning and guiding elements relative to one other and the first directing flow cooperates with a second directing flow of giblets, provided by movement of a plurality of pressing elements installed along and around a rotating shaft of the guiding station.

12. The machine, according to claim 11, wherein the cleaning assembly further comprising an inlet support and an outlet support supporting the edges of each cleaning and guiding element,
    wherein each cleaning and guiding element comprising guiding elements distributed along an entire contact surface of each cleaning and guiding element.

13. The machine, according to claim 12, wherein the cleaning assembly further comprising the cleaning and guiding elements set in groups,
    wherein directions of the respective guiding elements are pointed in opposite directions to each other, and
    wherein each group of cleaning and guiding elements works in an opposite direction to an adjacent group of cleaning and guiding elements.

14. The machine, according to claim 13, wherein each group of cleaning and guiding elements further comprising two cleaning and guiding elements with the guiding elements arranged diagonally along the contact surface of each cleaning and guiding element, and
    wherein the guiding elements of each cleaning and guiding element are positioned in directions concurrent with directions of the guiding elements of other cleaning and guiding elements belonging to a same group of cleaning and guiding elements.

15. The machine, according to claim 11, wherein the guiding station further comprising:
    supports installed along the rotating shaft and each support is used to support the plurality of pressing elements around the rotating shaft in positions displaced from positions of the pressing elements supported by each adjacent support,
    wherein the guiding station comprising giblet outlet guiding propellers that move the giblets from the guiding region to the giblet output region.

16. The machine, according to claim 1, wherein the drive assembly further comprising a gearmotor for moving a first drive gear and a second drive gear, both coaxial with one other,
    wherein the first drive gear transmits rotation to a first driven gear installed on the rotating shaft;

wherein the second drive gear transmits rotation to a first gear installed on a shaft of one of the cleaning and guiding elements;

wherein the first gear transmits rotation to a second gear installed on a shaft of a second one of the cleaning and guiding elements; and wherein the second gear transmits rotation to another subsequent gear until a last gear is reached, and the last gear transmits rotation to a peripheral gear.

17. The machine, according to claim 16, wherein the drive assembly further comprising a second gear installed on the rotating shaft that transmits rotation to a gear of a shaft for moving the inlet conveyor belt and the outlet conveyor belt of the machine, and wherein each rotation transmission between each pair of gears that are connected one to another is provided by a chain.

18. The machine, according to claim 1, wherein the cleaning assembly further comprising sliding guides for coupling and sliding on mounting rail rods of the cleaning assembly on the machine.

19. A method for conveying fowl giblets, for cleaning and peeling poultry giblets, applied in a machine comprising an inlet conveyor belt, conveying poultry giblets to a system for cleaning poultry giblets; and an outlet conveyor belt conveying the poultry giblets from the inlet conveyor belt and directing them to exit the cleaning system, using a collecting and distributing device; wherein, the system comprising a guiding station of giblets set against a cleaning assembly, both moved by a drive assembly, the system comprising:

(a) distributing poultry giblets on the machine;

(b) transporting the poultry giblets not classified as satisfactorily cleaned through the inlet conveyor belt onto the system;

(c) directing the poultry giblets to a guiding region defined by the positioning of the cleaning and guiding elements of the cleaning assembly;

(d) actuating a first directing flow of giblets in opposite directions to each other on the guiding region, and simultaneously actuating a second directing flow of giblets against the cleaning and guiding elements and towards the collecting and distributing device;

(e) collecting giblets through the collecting and distributing device and directing these giblets to the outlet conveyor belt;

(f) evaluating of giblets and transferring the giblets not classified as satisfactorily cleaned to the inlet conveyor belt;

(g) repeating (b) to (f) for giblets not classified as satisfactorily cleaned;

(h) transporting poultry giblets classified as satisfactorily cleaned from the outlet conveyor belt to a giblet collector; and (i) repeating (a) to (h), until the distribution of poultry giblets on the inlet conveyor belt is stopped.

20. The method, according to claim 19, wherein in (a) the distribution of giblets is performed by the giblet separating and distributing collector installed on the machine, wherein the giblet separating and distributing collector comprises a body with a reception and distributing duct and a diverting duct, separated from each other by a separating screen, wherein the reception and distributing duct ends up on the inlet conveyor belt and the diverting duct ends up into a drain pipe of the machine; and wherein in (d), the first directing flow is provided by movement of the cleaning and guiding elements relative to one other, and the second directing flow is provided by movement of a plurality of pressing elements installed along and around a rotating shaft of the guiding station.

* * * * *